US008824663B2

(12) United States Patent
Raghavan et al.

(10) Patent No.: US 8,824,663 B2
(45) Date of Patent: *Sep. 2, 2014

(54) SYSTEM, METHOD, AND COMPUTER PROGRAM PRODUCT FOR DETECTING REDUNDANCIES IN INFORMATION PROVIDED BY CUSTOMERS IN A CUSTOMER SERVICE SYSTEM

(71) Applicant: Nuance Communications, Inc., Burlington, MA (US)

(72) Inventors: Sridhar Raghavan, Austin, TX (US); Nasim Farsiniamarj, Montreal (CA); Karunakar Rao Chemudugunta, Milpitas, CA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,018

(22) Filed: Feb. 13, 2013

(65) Prior Publication Data

US 2013/0170631 A1    Jul. 4, 2013

Related U.S. Application Data

(63) Continuation of application No. 12/971,402, filed on Dec. 17, 2010, now Pat. No. 8,379,833.

(51) Int. Cl.
*H04M 3/00* (2006.01)
*H04M 3/51* (2006.01)

(52) U.S. Cl.
CPC .......... *H04M 3/51* (2013.01); *H04M 2203/401* (2013.01); *H04M 3/5175* (2013.01)
USPC ............ 379/266.01; 379/265.02; 379/266.06; 379/266.1

(58) Field of Classification Search
USPC ................ 379/266.01, 266.06, 266.1, 265.02
See application file for complete search history.

(56) References Cited

U.S. PATENT DOCUMENTS

| 5,740,233 | A  | 4/1998  | Cave et al. |
| 6,192,108 | B1 | 2/2001  | Mumford et al. |
| 6,243,680 | B1 | 6/2001  | Gupta et al. |
| 6,246,982 | B1 | 6/2001  | Beigi et al. |
| 6,380,937 | B1 | 4/2002  | Dong et al. |
| 6,493,703 | B1 | 12/2002 | Knight et al. |
| 6,778,982 | B1 | 8/2004  | Knight et al. |
| 6,842,504 | B2 | 1/2005  | Mills et al. |
| 6,868,525 | B1 | 3/2005  | Szabo |
| 6,934,935 | B1 | 8/2005  | Bennett et al. |
| 7,039,166 | B1 | 5/2006  | Peterson et al. |
| 7,047,486 | B1 | 5/2006  | Nagao |
| 7,360,151 | B1 | 4/2008  | Froloff |
| 7,366,780 | B2 | 4/2008  | Keller et al. |

(Continued)

Primary Examiner — Quynh Nguyen
(74) Attorney, Agent, or Firm — Lessani Law Group, PC

(57) ABSTRACT

The present invention provides a system, method, and computer program product for automatically detecting any unnecessary repetition by customers of specific types of information in a multi-channel (e.g., self-service application, IVR system, live agent center) customer service session. For each channel used in the customer service session, the information provided by the customer in the channel is recorded in a log, transcription, or other record. The record(s) for the customer service session are subsequently parsed for specific types of information provided by the customer. From the parsed records, specific types of information provided by the customer in two or more channels during the customer service session are identified. In one embodiment, the results are analyzed to determine if providing such information in two or more channels is redundant, and, if so, this is counted as a redundancy.

20 Claims, 4 Drawing Sheets

(56) References Cited

U.S. PATENT DOCUMENTS

| | | |
|---|---|---|
| 7,401,087 B2 | 7/2008 | Copperman et al. |
| 7,657,005 B2 | 2/2010 | Chang |
| 8,370,362 B2 | 2/2013 | Szabo |
| 8,380,696 B1 | 2/2013 | Rogers et al. |
| 8,401,156 B1 | 3/2013 | Milro et al. |
| 8,515,736 B1 | 8/2013 | Duta |
| 8,589,373 B2 | 11/2013 | Mayer |
| 2003/0204404 A1 | 10/2003 | Weldon et al. |
| 2003/0233224 A1 | 12/2003 | Marchisio et al. |
| 2004/0107088 A1 | 6/2004 | Budzinski |
| 2004/0252646 A1 | 12/2004 | Adhikari et al. |
| 2005/0114794 A1 | 5/2005 | Grimes et al. |
| 2006/0155662 A1 | 7/2006 | Murakami et al. |
| 2008/0010280 A1 | 1/2008 | Jan et al. |
| 2008/0084971 A1 | 4/2008 | Dhanakshirur |
| 2008/0300870 A1 | 12/2008 | Hsu et al. |
| 2008/0304632 A1 | 12/2008 | Catlin et al. |
| 2009/0245493 A1 | 10/2009 | Chen et al. |
| 2010/0122214 A1 | 5/2010 | Sengoku |
| 2010/0205180 A1 | 8/2010 | Cooper et al. |
| 2010/0312782 A1 | 12/2010 | Li et al. |
| 2010/0313157 A1 | 12/2010 | Carlsson et al. |
| 2011/0200181 A1 | 8/2011 | Issa et al. |
| 2011/0218983 A1 | 9/2011 | Chaney et al. |
| 2011/0238409 A1 | 9/2011 | Larcheveque et al. |
| 2011/0238410 A1 | 9/2011 | Larcheveque et al. |
| 2013/0139111 A1 | 5/2013 | Grimes et al. |

Efficiency

Total Calls: 573

| Information | Percentage of Calls with Repeated Information | | Data Grid ▽ |
|---|---|---|---|
| SSN | 30 | | |
| PIN | 10 | | |
| PHONE | 15 | | |
| CCN | 2 | | |
| ACCOUNT NUM | 40 | | |
| ADDRESS | 1 | | |

| Call Data | | | | Transition Log: | | 🔽 | 🗔 Call View ❓ |
|---|---|---|---|---|---|---|---|
| session id | duration | start time | end time | call reason | | redundancy | ou |
| 1B56C04E-E18A11D7-84E3B23E-5DE3ABD2 | 70 | 2010-04-14 15:30:41.0 | 2010-04-14 15:31:51.0 | ADD_FEATURES | | | |
| BA3CD82C-E18A11D7-84E3B23E-5DE3ABD2 | 56 | 2010-04-14 15:35:08.0 | 2010-04-14 15:36:04.0 | ADD_FEATURES | | | |
| 67B8F605-E18C11D7-8531B23E-5DE3ABD2 | 59 | 2010-04-14 15:47:08.0 | 2010-04-14 15:48:07.0 | ADD_FEATURES | | | |
| 99016B6E-E18D11D7-855BB23E-5DE3ABD2 | 82 | 2010-04-14 15:55:40.0 | 2010-04-14 15:57:02.0 | ACCOUNT_BALANCE | | | |
| DA915BAA-E18E11D7-868BB23E-5DE3ABD2 | 52 | 2010-04-14 16:04:40.0 | 2010-04-14 16:05:32.0 | ADD_FEATURES | | | |
| EC159282-E32411D7-9C1FB23E-5DE3ABD2 | 59 | 2010-04-16 16:31:07.0 | 2010-04-16 16:32:06.0 | ADD_FEATURES | | | |
| 7CE9A500-E32811D7-9C25B23E-5DE3ABD2 | 68 | 2010-04-16 16:56:38.0 | 2010-04-16 16:57:46.0 | ACCOUNT_BALANCE | | | |
| AC1BD179-E32gB11D7-9C2BB23E-5DE3ABD2 | 136 | 2010-04-16 17:19:26.0 | 2010-04-16 17:21:42.0 | TECHNICAL_SUPPORT | | | |
| CC00667F-E33111D7-9C31B23E-5DE3ABD2 | 57 | 2010-04-16 18:03:16.0 | 2010-04-16 18:04:13.0 | TECHNICAL_SUPPORT | | | |
| 8EB1E06F-E48711D7-9C59B23E-5DE3ABD2 | 89 | 2010-04-18 10:49:26.0 | 2010-04-18 10:50:55.0 | TECHNICAL_SUPPORT | | | |
| 1362C988-E48F11D7-9C5FB23E-5DE3ABD2 | 71 | 2010-04-18 11:43:15.0 | 2010-04-18 11:44:26.0 | TECHNICAL_SUPPORT | | | |
| E23C466F-E48F11D7-9C65B23E-5DE3ABD2 | 120 | 2010-04-18 11:49:02.0 | 2010-04-18 11:51:02.0 | TECHNICAL_SUPPORT | | | |
| 2556786A-E54F11D7-A032B23E-5DE3ABD2 | 17 | 2010-04-19 10:38:00.0 | 2010-04-19 10:38:17.0 | BILL_PAYMENT | | | |
| 5EC6048E-E55811D7-A13CB23E-5DE3ABD2 | 109 | 2010-04-19 11:44:02.0 | 2010-04-19 11:45:51.0 | ACCOUNT_BALANCE | | | |
| E8A19E5A-E56911D7-A390B23E-5DE3ABD2 | 67 | 2010-04-19 13:49:34.0 | 2010-04-19 13:50:41.0 | ADD_FEATURES | | | |
| 6AC959E2-E56F11D7-A408B23E-5DE3ABD2 | 99 | 2010-04-19 14:28:59.0 | 2010-04-19 14:30:38.0 | ACCOUNT_BALANCE | | ASK_PHONE | |
| 8119E830-E58711D7-A536B23E-5DE3ABD2 | 55 | 2010-04-19 17:21:24.0 | 2010-04-19 17:22:19.0 | ADD_FEATURES | | | |
| EACD9B51-E58911D7-A53CB23E-5DE3ABD2 | 144 | 2010-04-19 17:38:40.0 | 2010-04-19 17:41:04.0 | TECHNICAL_SUPPORT | | ASK_PHONE | |
| 4BA5B709-E62611D7-AB03B23E-5DE3ABD2 | 20 | 2010-04-20 12:17:57.0 | 2010-04-20 12:18:17.0 | ACCOUNT_BALANCE | | | |
| E5CF68DD-E64D11D7-AE11B23E-5DE3ABD2 | 59 | 2010-04-20 17:01:24.0 | 2010-04-20 17:02:23.0 | ADD_FEATURES | | | |
| 73B9F8CD-E64E11D7-AE17B23E-5DE3ABD2 | 62 | 2010-04-20 17:05:22.0 | 2010-04-20 17:06:24.0 | BILL_PAYMENT | | | |
| 78DA702F-E6E511D7-B09DB23E-5DE3ABD2 | 94 | 2010-04-21 11:06:18.0 | 2010-04-21 11:07:52.0 | TECHNICAL_SUPPORT | | ASK-PIN | |
| 6C444D52-E6EB11D7-B1A6B23E-5DE3ABD2 | 141 | 2010-04-21 11:48:54.0 | 2010-04-21 11:51:15.0 | TECHNICAL_SUPPORT | | | |
| C03A7A1C-E6F011D7-B27EB23E-5DE3ABD2 | 66 | 2010-04-21 12:27:02.0 | 2010-04-21 12:28:08.0 | ACCOUNT_BALANCE | | | |
| 270F652E-EAE711D7-9456B23E-5DE3ABD2 | 64 | 2010-04-26 13:27:42.0 | 2010-04-26 13:28:46.0 | BILL_PAYMENT | | ASK-PIN | |
| 9C690B97-EB9D11D7-BDCAB23E-5DE3ABD2 | 36 | 2010-04-27 10:29:00.0 | 2010-04-27 10:29:36.0 | TECHNICAL_SUPPORT | | | |
| B7127D11-EB9E11D7-BDF4B23E-5DE3ABD2 | 66 | 2010-04-27 10:36:54.0 | 2010-04-27 10:38:00.0 | TECHNICAL_SUPPORT | | | |
| FDFD8AF4-EBA211D7-BE66B23E-5DE3ABD2 | 53 | 2010-04-27 11:07:31.0 | 2010-04-27 11:08:24.0 | TECHNICAL_SUPPORT | | | |
| 62898E7F-EBA611D7-BEF6B23E-5DE3ABD2 | 62 | 2010-04-27 11:31:48.0 | 2010-04-27 11:32:50.0 | TECHNICAL_SUPPORT | | | |
| 560DB5FA-EBC611D7-81A4B23E-5DE3ABD2 | 55 | 2010-04-27 15:20:30.0 | 2010-04-27 15:21:25.0 | TECHNICAL_SUPPORT | | | |
| D7CBDDE4-ED5611D7-944DB23E-5DE3ABD2 | 7 | 2010-04-29 15:07:09.0 | 2010-04-29 15:07:16.0 | UNKNOWN | | | U |
| FF3C7231-ED5A11D7-945FB23E-5DE3ABD2 | 53 | 2010-04-29 15:36:53.0 | 2010-04-29 15:37:46.0 | TECHNICAL_SUPPORT | | | |
| 4F383672-EE0111D7-9960B23E-5DE3ABD2 | 56 | 2010-04-30 11:27:16.0 | 2010-04-30 11:28:12.0 | UNKNOWN | | | U |
| 875A07A1-F20711D7-B2CEB23E-5DE3ABD2 | 63 | 2010-05-05 14:21:08.0 | 2010-05-05 14:22:11.0 | ADD_FEATURES | | | |
| 17CF39D5-F20811D7-B2D4B23E-5DE3ABD2 | 5 | 2010-05-05 14:25:15.0 | 2010-05-05 14:25:15.0 | UNKNOWN | | | U |

SYSTEM, METHOD, AND COMPUTER PROGRAM PRODUCT FOR DETECTING REDUNDANCIES IN INFORMATION PROVIDED BY CUSTOMERS IN A CUSTOMER SERVICE SYSTEM

RELATED APPLICATIONS

This application is a continuation of co-pending U.S. patent application Ser. No. 12/971,402, titled "System, Method, and Computer Program Product for Detecting Redundancies in Information Provided by Customers in a Customer Service System," and filed on Dec. 17, 2010, the contents of which are incorporated herein by reference as if fully disclosed herein.

BACKGROUND OF THE INVENTION

1. Field of the Invention

This invention relates generally to customer service systems, and, more particularly, to detecting redundancies in information provided by customers in a customer service system.

2. Description of the Background Art

Many customer service systems have multiple channels to communicate with customers. During a customer service session, a customer may be transferred from one channel to another channel. For example, a customer may call into an IVR system and then be transferred to a live agent center. Alternately, a customer may use a self-service application provided by a customer service system and then connect with an IVR system or live agent. During a single customer service session, customers are sometimes asked to provide the same information in different channels. For example, a user may be asked by both an IVR system and a live agent to provide his account number. This redundancy often increases the length of the customer service session and frustrates customers. Consequently, it is desirable to be able to automatically detect when customers are asked to unnecessarily repeat information in a multi-channel customer service session. Detecting such redundancies will help an application designer create a better application dialog/flow that eliminates such redundancies, thereby increasing customer satisfaction.

SUMMARY

The present invention provides a system, method, and computer program product for automatically detecting any unnecessary repetition by customers of specific types of information in a multi-channel customer service session. The customer service system creates a record of information provided by a customer via a first channel within the customer service system. If the customer service session is transferred to a second channel, the customer service system also creates a record of information provided by the customer during the customer service session via the second channel.

The record associated with the first channel is parsed for specific types of information provided by the customer via the first channel during the customer service session. Similarly, the record associated with the second channel is also parsed for specific types of information provided by the customer via the second channel during the customer service session.

From the parsed records, specific types of information provided by the customer in both the first and second channels during the customer service session are identified. In one embodiment, the results are analyzed to determine if providing such information in both channels was redundant, and, if so, this is counted as a redundancy. Such information may be used by an application designer to design a better application or dialog that eliminates or reduces requesting redundant information from a customer

BRIEF DESCRIPTION OF THE DRAWINGS

FIG. 3 is a screen shot of an example report illustrates the percentage of calls to an IVR system/live agent with repeated information.

FIG. 4 is a screen shot of an example report that lists individual customer service sessions and any redundant information provided during a customer service session.

DETAILED DESCRIPTION OF THE PREFERRED EMBODIMENTS

Figure 2:
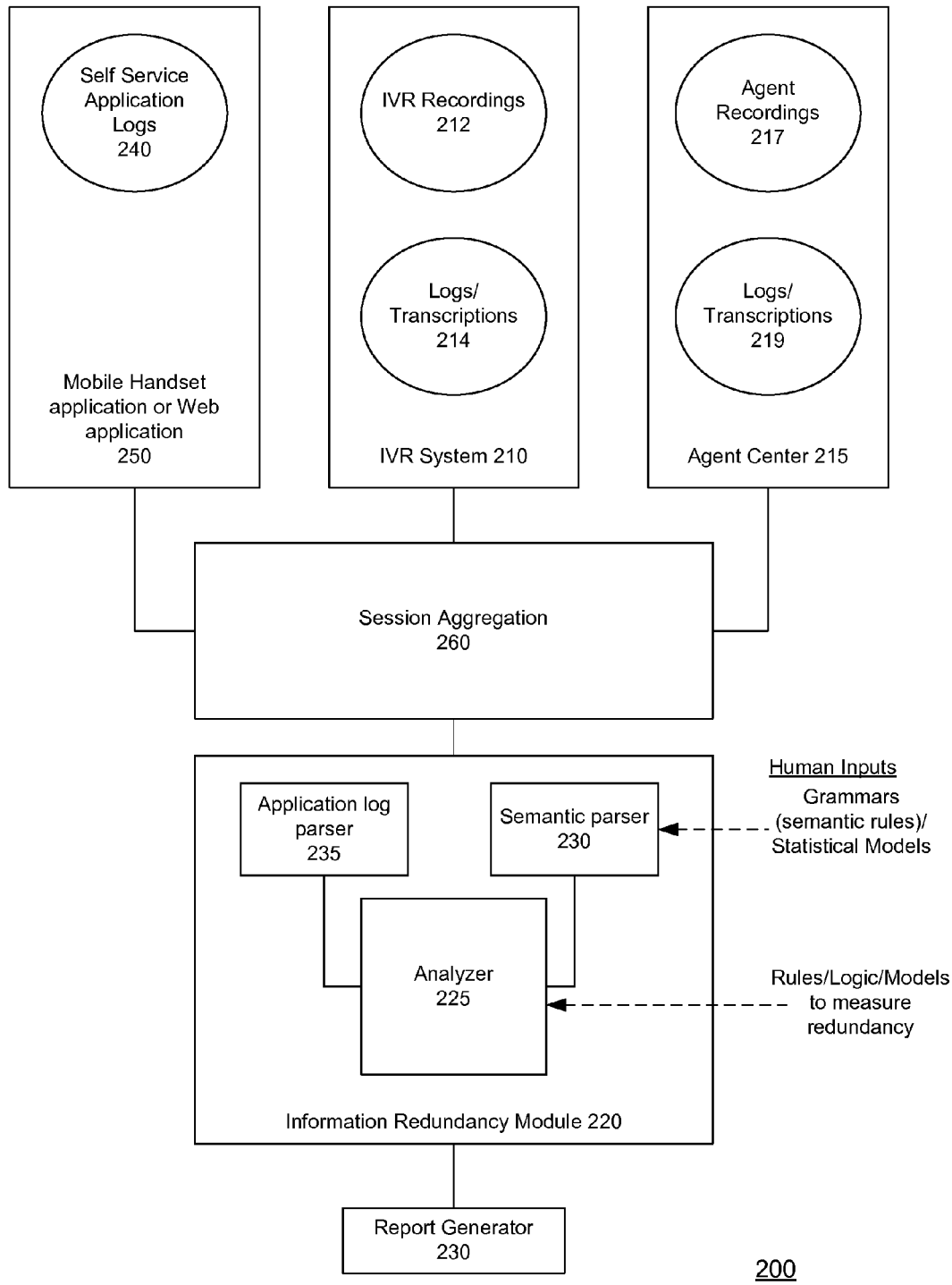
FIG. 2 is a block diagram of an example customer service system according to one embodiment of the invention.

FIG. 2 illustrates an example of a customer service system. Customer service system 200 includes three channels via which a customer can communicate with the system 200. The customer may communicate with the system via a self-service software application 250, such as a mobile handset application or a web application, an IVR system 210, or a live agent center 215. Those skilled in the art will appreciate that a customer service system may include less or more channels. Customer service system 200 is just an example and the invention is not limited to this system. The other illustrated elements of system 200 will be described later.

Figure 1:
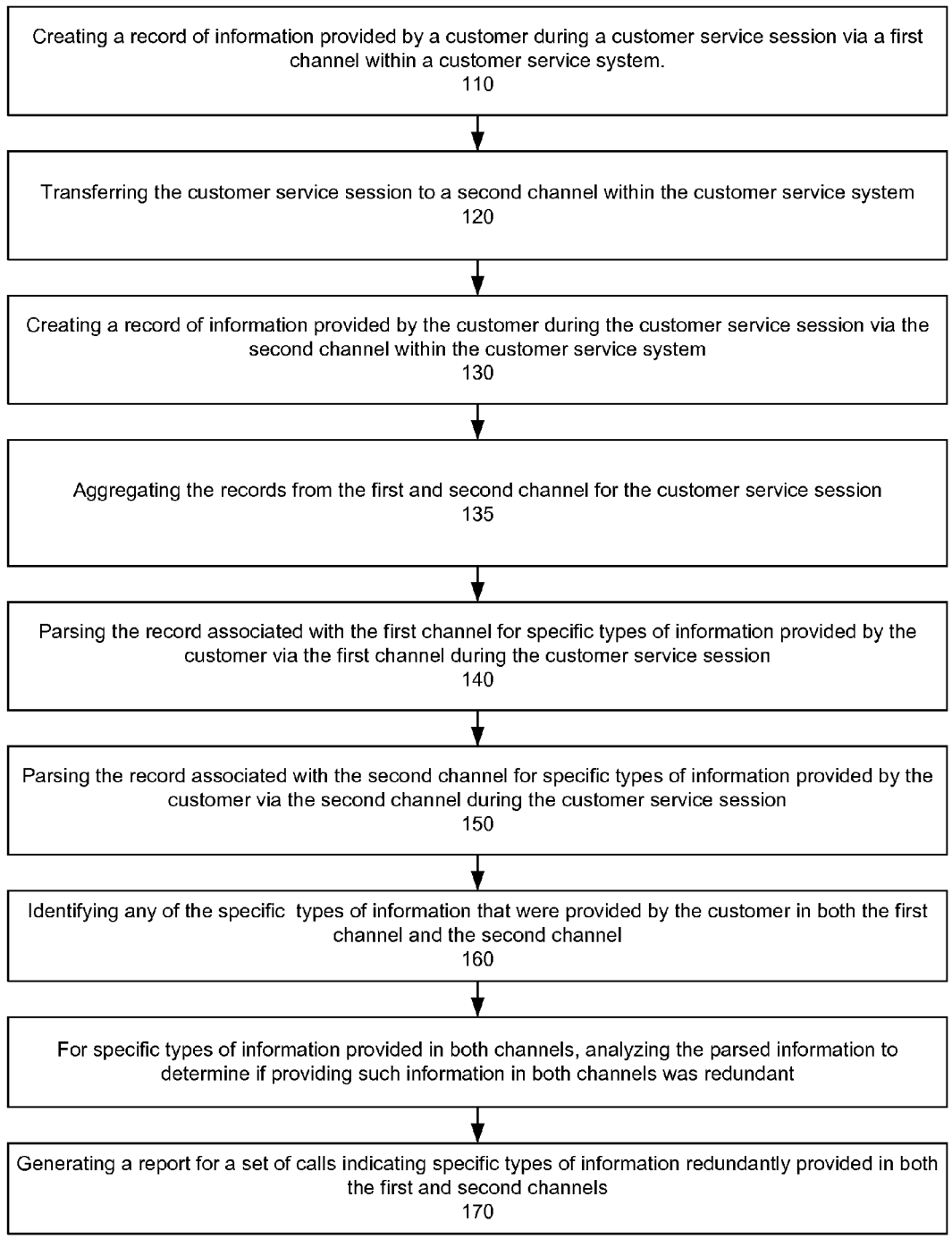
FIG. 1 is a flowchart that illustrates an automated method for detecting the unnecessary repetition of specific types of information in a customer service session according to one embodiment of the present invention.

FIG. 1 illustrates an automated method for detecting the unnecessary repetition of specific types of information in a customer service session that is transferred from a first channel within a customer service system to a second channel within the customer service system. The customer service system creates a record of information provided by a customer via a first channel within the customer service system (step 110). In response to a user request or for other reasons, the customer is transferred to a second channel within the customer service system (step 120). The customer service system creates a record of information provided by the customer during the customer service session via the second channel (step 130).

The customer service system aggregates the records from the first and second channels for the customer service session (135). The record associated with the first channel is then parsed for specific types of information provided by the customer via the first channel during the customer service session (step 140). The record associated with the second channel is also parsed for specific types of information provided by the customer via the second channel during the customer service session (step 150).

From the parsed records, any specific type of information provided by the customer in both the first and second channels during the customer service session is identified (step 160). The parsed information is analyzed to determine if providing such information in both channels was redundant, and, if so, this is counted as a redundancy (step 165). A report is generated for a set of customer service sessions indicating specific types of information that were redundantly provided by customers in both the first and second channels (step 170).

During a customer service session, a customer may be transferred to a third channel in the customer service system.

The above-described method is not limited to finding repetition across two channels. A record is created for each channel in which a customer provides information, and each record may be parsed to identify whether specific types of information are repeated by the customer in multiple channels (e.g., records from three or more channels may be compared).

Examples of specific types of information for which the records may be parsed include phone number, social security number, pin, password, name, credit card number, and account number.

In one embodiment, records from an IVR system and live agent center are in the form of transcripts that are created by transcribing audio recordings of the customer, IVR system, and live agent. In the preferred embodiment, audio recordings in the IVR channel and live agent channel are stereo recordings in which the customer, agent, and/or IVR system are on different audio streams.

In one embodiment, records from a self-service software application, such as a web application or a mobile handset application, are in the form of logs.

The example customer service system illustrated in FIG. 2 includes a Session Aggregation Module 260, an Information Redundancy Module (IRM) 220, and a Report Generator 230. The Session Aggregation Module 260 aggregates records from a single customer service session that spanned two or more channels. For example, if the customer called into the IVR system and then was transferred to a live agent, the Session Aggregation Module 260 aggregates the records (i.e., the transcriptions) from IVR system 210 and the Agent Center 215 for the applicable customer service session.

Records across multiple channels may simply be aggregated or they may be combined into one record. If a single record is maintained across multiple channels, then, for logs, the separation between channels is logged, or, for transcriptions, the transcription is parsed for the separation point.

The Information Redundancy Module (IRM) 220 identifies the specific types of information that were provided by a customer in two or more channels during a single customer service session. In one embodiment, the IRM 220 maintains a count of the number of times a specific type of information was provided by the customer during the customer service session.

The IRM 220 includes an application log parser 235, a semantic parser 230, and an Analyzer 225. The semantic parser 230 parses transcriptions for specific types of information. The parsing is performed using grammars, semantic rules, or statistical models input by a system administrator. The grammars are rules to parse textual information to identify named entities (i.e., the specific types of information). The statistical models are models trained on labeled text data to automatically detect named entities.

The application log parser 235 parses logs. If the logs contain unstructured data from which the log parser 235 has to mine the specific types of information, the application log parser may use grammars or statistical models to parse the logs. If the logs have structured data that clearly mentions the specific types of information for which the log parser is looking, then application log parser likely can parse the logs without using grammars or statistical models.

The Analyzer 225 analyzes the parsed results to determine whether information repeated during a customer service session is redundant. The logic used to determine the redundancy can be controlled using rules provided to the Analyzer 225. In one embodiment, the inputs to the Analyzer include the following:

A unique customer service session ID for each customer service session analyzed

Relevant metadata from each customer service sessions, such as channel types used in the customer service session (e.g., IVR, AGENT, WEB, MOZBILE, etc.), timestamps, application who data the Analyzer 225 is analyzing (e.g., application for Company ABC), etc.

Parsed information. This is the output of the application log parser 235 and/or semantic parser 230

Rules that describe the logic to measure redundancy

Below are examples of the type of rules that may be used by the Analyzer:

1) Rule: Do not count multiple occurrences of specific types of information within the same channel as a redundancy.

The above rule ensures that redundancy is only counted across channels. Under this rule, redundancies within a channel are ignored.

2) Rule: A valid count should be comprised of both a question and a response.

This rule ensures that both sides of an interaction are considered in validating a single count. For example, if the IVR systems says "Please give me your 10 digit social security number," the rule ensures that, the customer did indeed provide the 10 digit social security number before associating "social security number" with one count.

3) Rule: Consider two different specific types of information as the same information.

This rule ensures that Analyzer 225 combines the counts of two different types of information to determine redundancy. For example, assume the rule specifies that Account # and Phone # should be counted as the same information. If a customer provides Account # to an IVR system and a live agent later asks for Phone #, the Analyzer will count this as a valid redundancy (if implementing this rule).

The above rules are only examples, and other types of rules may be applied.

The Report Generator 230 generates reports based on the output of the IRM 220. For example, the Report Generator 230 may generate a report that specifies the percentage of customer service sessions with redundancies. FIG. 3 is an example of such a report. This figure illustrates the percentage of calls to an IVR system where the customer provided a specific type of information (i.e., SSN, PIN, PHONE, CCN, ACCOUNT NUM, and ADDRESS) to both the IVR system and a live agent.

FIG. 4 illustrates an example of another type of report that may be generated by the Report Generator 230. This report covers a set of customer service sessions. For each customer service session, the report lists any specific types of information that were repeated across two different channels by the customer. In FIG. 4, the report shows that there were two customer service sessions where customers had to redundantly provide their phone number at least twice and two customer services sessions where customers had redundantly provide their pin at least twice.

The term customer as used herein includes customers, prospective customers, and other users of customer service systems.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. An automated method for detecting the repetition of specific types of information in a customer service session that spans multiple channels within the customer-service system, the method comprising:

creating a record of information provided by a customer during a customer service session via a first channel within the customer service system;

creating a record of information provided by the customer during the customer service session via a second channel within the customer service system;

parsing the record associated with the first channel for specific types of information provided by the customer during the customer service session;

parsing the record associated with the second channel for specific types of information provided by the customer during the customer service session;

identifying any of the specific types of information that were provided by the customer during the customer service session in both the first channel and the second channel; and in response to identifying one or more specific types of information that were provided in both the first and second channel during the customer service session, applying one or more rules to determine whether providing such information in both channels was redundant.

2. The method of claim 1, further comprising:

creating a record of the information provided by the customer during the customer service session via a third channel in the customer service system; and parsing the record associated with the third channel for specific types of information provided by the customer during the customer service session;

wherein the identifying step comprises identifying any of the specific types of information that were provided by the customer in two or more channels, and wherein the applying step comprises applying one or more rules to determine whether providing such information in two or more channels was redundant.

3. The method of claim 2, wherein the first, second, and third channels are each one of the following: an IVR system, a live agent communication center, and a self-service software application.

4. The method of claim 1, wherein one of the first and second channels is an IVR system.

5. The method of claim 1, wherein one of the first and second channels is a live agent communication center.

6. The method of claim 1, wherein one of the first and second channels is a self-service software application on a mobile platform.

7. The method of claim 1, wherein one of the first and second channels is a web application.

8. The method of claim 1, wherein one rule specifies that redundancies are counted across channels and not within channels.

9. The method of claim 1, wherein one rule specifies that a valid count for the purpose of determining redundancy comprises both a question and a response.

10. The method of claim 1, wherein one rule specifies that a count for a first type of information and a second type of information should be combined.

11. The method of claim 1, further comprising creating a report encompassing a plurality of customer service sessions that that indicates the specific types of information that were provided by customers in both the first and second channels.

12. The method of claim 1, further comprising:

for a set of customer service sessions, identifying, for each of the specific types of information, the percentage of calls in the set for which the specific type of information was provided by customers in both the first and second channels.

13. A system for detecting the repetition of specific types of information in a customer service session that spans multiple channels in a customer service system, the system comprising:

a first customer service subsystem for providing a customer service session via the first channel and for creating a record of information provided by a customer via the first channel during such customer service session;

a second customer service subsystem for providing a customer service session via the second channel and for creating a record of information provided by a customer via the second channel during such customer service session;

a session aggregator, operatively couple to both the first customer service subsystem and the second customer service subsystem, for aggregating records for customer service sessions spanning the first channel and the second channels;

one or more parsers for receiving aggregated records from the session aggregator and, for each customer service session spanning the first channel and second channel, parsing the records for such customer service session for specific types of information provided by a customer during such customer service session; and an analyzer for receiving the output from the parser(s) and identify any of the specific types of information that were provided by a customer in both the first and second channels during a single customer service session, wherein, in response to identifying one or more specific types of information that were provided in both the first and second channels, the analyzer applies one or more rules to determine whether providing such information in both channels was redundant.

14. The system of claim 13, further comprising a report generating module for creating reports that identify specific types of information provided by a customer in both the first and second channels in a single customer service session.

15. The system of claim 13, wherein one of the first and second subsystems includes a self-service mobile application on a mobile device.

16. The system of claim 13, wherein one of the first and second subsystems includes a self-service web application.

17. The system of claim 13, wherein one rule specifies that redundancies are counted across channels and not within channels.

18. The system of claim 13, wherein one rule specifies that a valid count for the purpose of determining redundancy comprises both a question and a response.

19. The system of claim 13, wherein one rule specifies that a count for a first type of information and a second type of information should be combined.

20. A non-transitory tangible computer-readable medium comprising computer program code, that, when executed by a computer system, enables the computer system to perform the following method:

creating a record of information provided by a customer during a customer service session via a first channel within the customer service system;

creating a record of information provided by the customer during the customer service session via a second channel within the customer service system;

parsing the record associated with the first channel for specific types of information provided by the customer during the customer service session;
parsing the record associated with the second channel for specific types of information provided by the customer during the customer service session;
identifying any of the specific types of information that were provided by the customer in both the first channel and the second channel during the customer service session; and
in response to identifying one or more specific types of information that were provided in both the first and second channel during the customer service session, applying one or more rules to determine whether providing such information in both channels was redundant.

* * * * *